United States Patent
Meier-Arendt et al.

(10) Patent No.: US 7,277,780 B2
(45) Date of Patent: Oct. 2, 2007

(54) METHOD FOR CONTROLLING THE OUTPUTTING OF MESSAGES

(75) Inventors: Guido Meier-Arendt, Langen (DE); Winfried Möll, Laubach (DE)

(73) Assignee: Siemens Aktiengesellschaft, Munich (DE)

( * ) Notice: Subject to any disclaimer, the term of this patent is extended or adjusted under 35 U.S.C. 154(b) by 367 days.

(21) Appl. No.: 10/933,499

(22) Filed: Sep. 3, 2004

(65) Prior Publication Data
US 2005/0096808 A1    May 5, 2005

(30) Foreign Application Priority Data
Sep. 4, 2003   (DE) ................. 103 40 870

(51) Int. Cl.
*G06F 3/14* (2006.01)
*G06F 7/00* (2006.01)

(52) U.S. Cl. .......................... 701/1; 340/438
(58) Field of Classification Search ............... None
See application file for complete search history.

(56) References Cited

U.S. PATENT DOCUMENTS

| | | | |
|---|---|---|---|
| 6,289,332 B2* | 9/2001 | Menig et al. ................. 707/1 |
| 6,542,868 B1* | 4/2003 | Badt et al. ................... 704/270 |
| 6,882,906 B2* | 4/2005 | Geisler et al. ................ 701/1 |
| 6,957,128 B1* | 10/2005 | Ito et al. ...................... 701/1 |
| 2001/0012976 A1* | 8/2001 | Menig et al. ................. 701/1 |
| 2004/0204157 A1* | 10/2004 | Remboski et al. ........ 455/569.1 |
| 2005/0143884 A1* | 6/2005 | Bihler et al. ................. 701/36 |

FOREIGN PATENT DOCUMENTS

| | | |
|---|---|---|
| DE | 10052654 A1 | 5/2002 |
| DE | 10060736 A1 | 6/2002 |
| DE | 10144752 A1 | 3/2003 |
| DE | 10153987 A1 | 5/2003 |
| EP | 1182089 A2 | 2/2002 |
| EP | 0903264 B1 | 6/2003 |
| WO | WO 03/039914 A1 * | 5/2003 |

\* cited by examiner

*Primary Examiner*—Michael J. Zanelli
(74) *Attorney, Agent, or Firm*—Morrison & Foerster LLP

(57) ABSTRACT

A method for controlling the outputting of messages in an information system of a motor vehicle, the messages being assigned priorities, there is provision for the sequence, the time and, if appropriate, also the method (visual, audible, tactile) of the outputting of the messages to depend on the priority of the respective message and on criteria which are formed from information received from the information system.

14 Claims, 1 Drawing Sheet

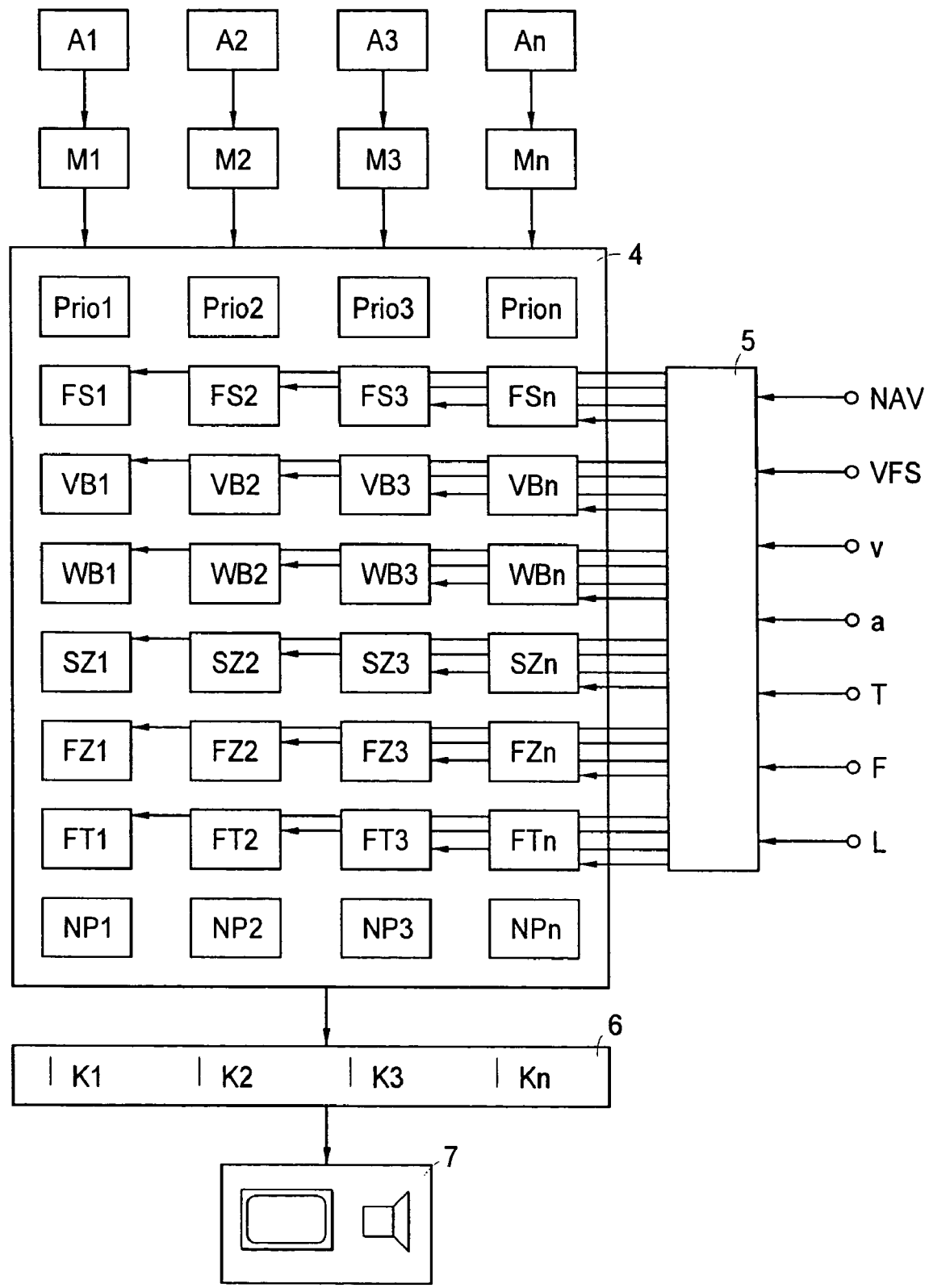

METHOD FOR CONTROLLING THE OUTPUTTING OF MESSAGES

CLAIM FOR PRIORITY

This application claims the benefit to German Application No. 10340870.3, which was filed on Sep. 4, 2003, the contents of which are hereby incorporate by reference.

TECHNICAL FIELD OF THE INVENTION

The invention relates to a method for controlling the outputting of messages in an information system of a motor vehicle, the messages being assigned priorities.

BACKGROUND OF THE INVENTION

Information systems for motor vehicles have to output a large number of different messages, i.e. they have to present messages in a way which can be perceived visually or audibly by the driver. Examples of such messages are "headlight on", "fuel tank on reserve", "brake system defective", "incoming call" or "turn off to the right". These messages may originate from various application areas, for example from the customary sensor system of the motor vehicle or from devices such as navigation devices, a radio telephone or a traffic news radio service. The number of messages and a possible accumulation thus constitute a burden for the driver which can distract him from the actual task of driving. Even if the messages are assigned priorities, a message with a high priority may be output immediately even though the travel situation and/or the presence of other messages would make a different sequence or a different time seem appropriate.

SUMMARY OF THE INVENTION

The invention discloses a sequence and the time of outputting messages depending on the priority of the respective message and on criteria which are formed from information received from the information system.

In one embodiment of the invention, the invention takes into account the burdening of the driver in a respective specific travel relationship (road conditions, weather conditions and traffic conditions), as a result of which road safety and comfort are improved. Furthermore, a message is perceived with a higher degree of reliability if it is output at a time at which the attention of the driver is not taken up by other messages or activities.

In another embodiment according to the invention, it is possible to provide for at least some of the information to be transmitted by sensors in the motor vehicle to the information system. Sensors which are suitable for this are, for example, speed sensors and acceleration sensors, temperature sensors and steering angle sensors. For example, a temperature sensor can be used to infer the state of the road as a criterion—a risk of black ice at a temperature of approximately 0° C. Such a criterion can also be derived by additionally using a moisture sensor.

In yet another embodiment according to the invention, it is also possible to provide for at least some of the information to be transmitted by information systems which are located outside the motor vehicle. Such information systems are, for example, any traffic information systems such as a traffic news radio service and radio beacons, or GPS satellites. From the information which is acquired in this way it is possible to acquire further criteria, possibly using information which is derived from sensors in the motor vehicle.

Finally it is possible to provide for further criteria to be stored in the information system. Here, for example use preferences of the driver, for example that he would like to have incoming calls indicated immediately, can be set.

The individual criteria can be advantageously processed in the invention by virtue of the fact that messages which are to be output are evaluated in each case with a code number which is calculated from the priority and the criteria, and that the outputting is carried out with the sequence of the code numbers.

In another embodiment according to the invention, when selected criteria are fulfilled, messages are delayed until the respective criterion is no longer fulfilled. As a result, regardless of a respective specific sequence, the outputting of messages at an unsuitable time can be avoided. For example, it is possible to use a navigation system and, if appropriate, an acceleration sensor to determine, as a "travel situation" criterion, when a vehicle travels onto a freeway access road so that, because of the increased attentiveness required of the driver when feeding in, messages are not output until this travel situation has ended.

In particular the following criteria are possible with the invention: travel situation, traffic conditions, weather conditions, state of the road, state of the driver, driver type and use preferences.

In another embodiment of the invention, outputting is selected as a function of the priority and the criteria. Here, for example messages which are to be output immediately owing to classifications with a high priority and high code number can be represented in a highlighted form. Thus, other means of perception can be used to output the messages, for example an audible output or tactile output in addition to a display. A change, for example through corresponding coloring or flashing, may also take place within a visual output.

BRIEF DESCRIPTION OF THE DRAWINGS

The invention is described in more detail below with reference to the drawings, in which:

FIG. 1 shows various applications which generate messages, for example a navigation system, a telephone, a fuel filling level indicator of a fuel tank, a traffic news radio service receiver and a series of monitoring systems in the vehicle.

DETAILED DESCRIPTION OF THE INVENTION

FIG. 1 shows various applications A1 to An which generate messages, for example a navigation system, a telephone, a fuel filling level indicator of a fuel tank, a traffic news radio service receiver and a series of monitoring systems in the vehicle. These messages M1 to Mn are fed to a classification means 4 in which a code number, which depends on the priority of the message and various criteria, is appended to the message which is to be output.

In particular, these criteria for the individual messages are respectively the travel situation FS1 to FSn, the traffic conditions VB1 to VBn, the weather conditions WB1 to WBn, the state of the road SZ1 to SZn, the state of the driver FZ1 to FZn and the driver type FT1 to FTn as well as the use preferences NP1 to NPn which can be input by the user or the driver. While the priority of a message is its property, the other criteria depend on various information which is fed to the driver information system. In the exemplary embodiment the following are illustrated: information NAV from a navigation system, information from a traffic news radio system VFS, the velocity v of the motor vehicle, the acceleration a, the temperature T, the moisture F on the windshield and the steering movement L. This information is converted into the individual criteria at 5.

As already described above, it is possible to use the navigation system to detect that the vehicle is on an acceleration lane of a freeway access road. If a relatively high vehicle acceleration a is also present, the criterion FS is set to a low code number. The code numbers are then added to each message at 6 in order to control the sequencing of the messages which are to be output. The outputting is carried out at 7. A message is output with a delay in accordance with the calculated code number K1 to Kn. The higher the code number, the sooner the message is output. The functions 4 to 7 are expediently carried out by a computer which is present in the information system.

The significance of the criteria is explained below by means of examples. Firstly, the priority of a message will be explained once more. Thus, for example a navigation instruction receives a higher code number than a wiping water warning so that the navigation instruction is output as quickly as possible and the driver is informed in good time before a turning-off maneuver. In the case of the travel situation FS criterion, a higher code number is allocated to the respective message in the case of a freeway journey with a constant progression, for example, than in the case of an overtaking maneuver. In the case of the further criterion of the traffic conditions VB, a higher code number is set when the freeway is free than when traffic is beginning to back up.

In the case of the weather conditions WB criterion, a higher code number is produced during good weather than during difficult weather, for example when there is fog. As a result, messages with a high priority are output quickly, but less important messages are output only with a delay.

The procedure is similar with the state of the road SZ criterion, in which, for example, the dry road condition results in a higher code number than the snow and ice condition.

Lastly, the state of the driver FZ signifies whether he is rested or is already tired as a result of a relatively long journey. This may be detected by various measurements, for example sensors have become known which evaluate the eyelid closing reflex of the driver. If the driver is (still) very receptive, a higher code number can be set for this criterion than if he is tired.

The driver type FT criterion represents a personal characteristic of the driver, indicating whether he is in fact capable of absorbing a relatively large number of different messages. This criterion can be set, for example, by evaluating his behavior in the motor vehicle. A driver who often operates functions while driving is classified as more active and thus with a higher code number than a driver who has a more passive behavior.

Finally, the criterion NP can be input manually. Thus, for example a user can basically have incoming telephone calls indicated to him immediately. By appropriately setting this criterion, the message "incoming call" is thus given a relatively high code number.

When the individual criteria are produced and when the respective code number is generated, a weighting between the criteria has to be carried out. Thus, for example the state of the driver FZ criterion should be given a higher weighting than the use preference NP criterion since the intended relieving of the burden on the driver should be prevented from being negated by incorrect setting of this last criterion.

What is claimed is:

1. A method for controlling the outputting of messages in an information system of a motor vehicle, comprising:
    assigning a priority to each of a plurality of messages;
    determining a sequence and a duration for an outputting of the messages based on the respective priorities of the messages;
    receiving information at the information system; and
    altering the sequence of the outputting of the plurality of messages based on criteria which are formed from the information received at the information system.

2. The method as claimed in claim 1, wherein at least some of the information is transmitted by sensors in the motor vehicle to the information system.

3. the method as claimed in claim 1, wherein at least some of the information is transmitted by information systems which are located outside the motor vehicle.

4. The method as claimed in claim 1, wherein further criteria are stored in the information system.

5. The method as claimed in claim 1, wherein, when selected criteria are fulfilled, messages are delayed until the respective criterion is no longer fulfilled.

6. The method as claimed in claim 5, wherein the selected criterion is the travel situation.

7. The method as claimed in claim 1, wherein one of the criteria includes traffic conditions.

8. the method as claimed in claim 1, wherein one of the criteria includes weather conditions.

9. The method as claimed in claim 1, wherein one of the criteria includes a state of a road.

10. The method as claimed in claim 1, wherein one of the criteria includes a state of a driver.

11. the method as claimed in claim 1, wherein one of the criteria includes a driver type.

12. The method as claimed in claim 1, wherein one of the criteria is formed by use preferences which can be input.

13. The method as claimed in claim 1, wherein the outputting is selected as a function of the priority and the criteria.

14. A method for controlling the outputting of messages in an information system of a motor vehicle, comprising:
    assigning a priority to each of a plurality of messages, wherein a sequence and a time of the outputting of the messages depend on the priority of a respective message and on criteria which are formed from information received from the information system;
    wherein messages which are to be output are evaluated in each case with a code number which is calculated from the priority and the criteria, and the outputting is carried out with the sequence of the code numbers.

* * * * *